United States Patent [19]

Petty

[11] 4,159,123
[45] Jun. 26, 1979

[54] MOTORCYCLE BRAKING MECHANISM INCLUDING MEANS FOR CONTROLLING TELESCOPING ACTION OF THE FRONT FORK MEANS

[76] Inventor: Preston L. Petty, P.O. Box 4158, Scottsdale, Ariz. 85258

[21] Appl. No.: 825,613

[22] Filed: Aug. 18, 1977

[51] Int. Cl.² .................... B62K 21/02; B62K 25/08
[52] U.S. Cl. ................... 280/276; 188/272; 280/88; 280/703
[58] Field of Search ............ 280/276, 277, 283, 286, 280/88, 702, 703, 670; 188/272; 180/32

[56] References Cited

U.S. PATENT DOCUMENTS

| | | | |
|---|---|---|---|
| 3,694,004 | 9/1972 | Siebers | 280/277 |
| 3,701,544 | 10/1972 | Stankovich | 280/276 |
| 3,989,261 | 11/1976 | Kawaguchi | 280/276 |

FOREIGN PATENT DOCUMENTS

| | | | |
|---|---|---|---|
| 691551 | 5/1953 | United Kingdom | 280/277 |
| 717259 | 10/1954 | United Kingdom | 280/276 |

*Primary Examiner*—John P. Silverstrim
*Attorney, Agent, or Firm*—Harvey S. Hertz

[57] ABSTRACT

A motorcycle braking mechanism includes a brake plate that is rotatably mounted on a front axle and a torque arm is secured to the brake plate. A rod has one end pivotally connected to the torque arm and the other end is pivotally connected to a clamp that is secured onto the upper fork tube so that when braking action is applied to the front brake, the brake plate applies a torquing force to the torque arm which is translated into a linear force via the rod thereby reducing the downward movement of the fork tube relative to the slider.

2 Claims, 3 Drawing Figures

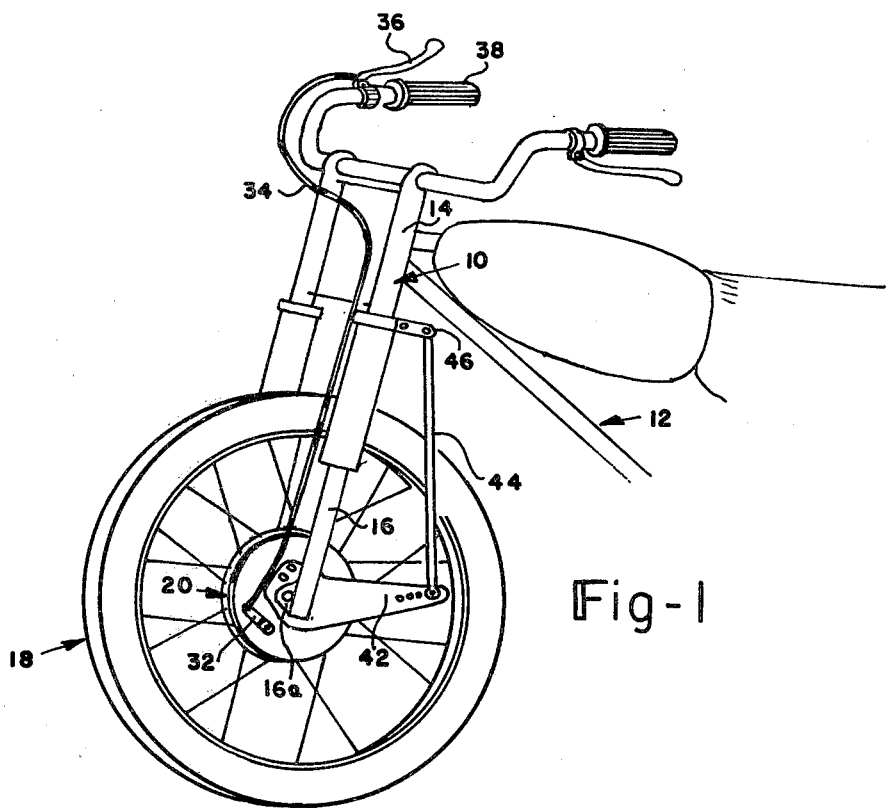
Fig-1
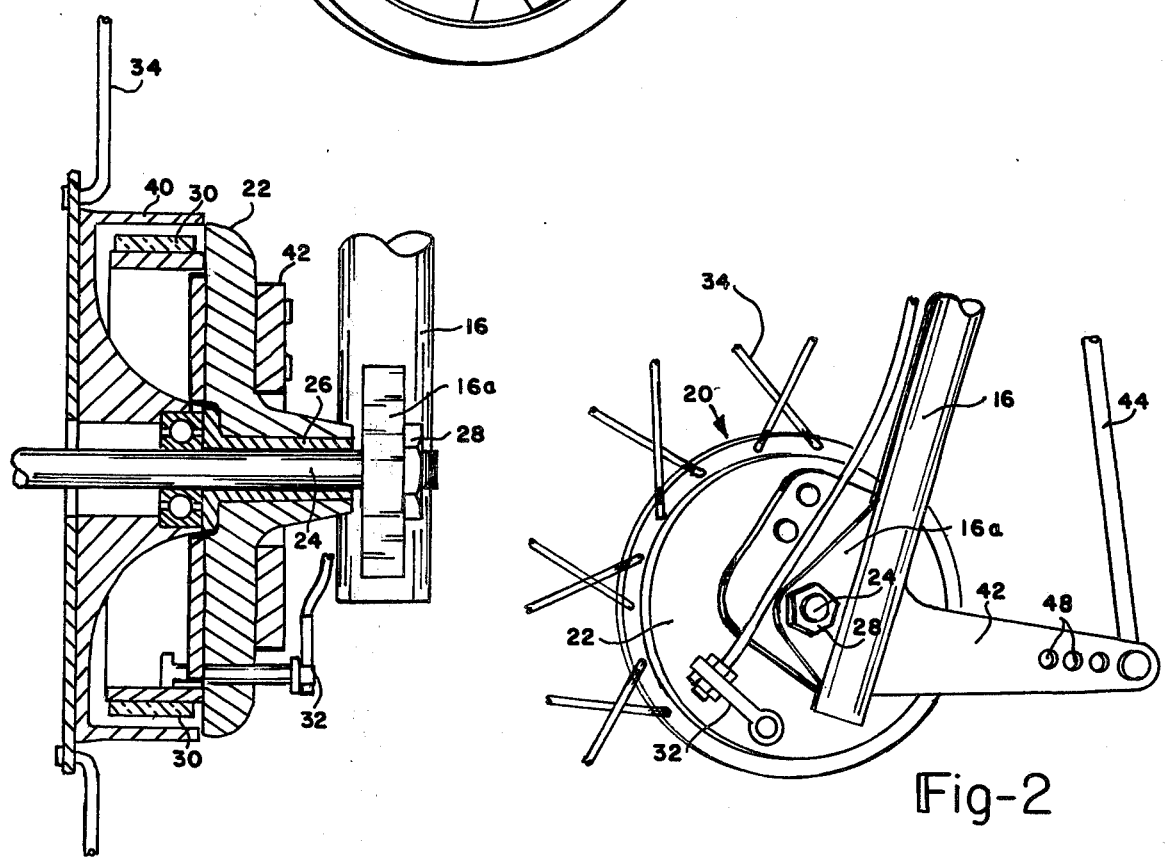
Fig-3
Fig-2

MOTORCYCLE BRAKING MECHANISM INCLUDING MEANS FOR CONTROLLING TELESCOPING ACTION OF THE FRONT FORK MEANS

BACKGROUND OF THE INVENTION

When braking action is applied to the front braking mechanism of a motorcycle, the fork tube means moves downward along the slider means that carry the front wheel and front braking mechanism. The amount of braking action that is applied to the front braking mechanism will determine the amount of relative compression movement of the fork tube means along the slider means. If the braking action is such that it will cause the front end to nose down a substantial amount, this can make it difficult to control the motorcycle, because the distribution of weight has been moved forward, and, if it is nighttime, the front light has been directed immediately in front of the motorcycle instead of along the normal direction along the roadway. Such conditions make it dangerous for operating motorcycles.

SUMMARY OF THE INVENTION

This invention relates to braking mechanisms and more particularly to braking mechanisms for use on motorcycles for controlling the relative movement between the fork tube means and the slider means.

An object of the present invention is to provide a front braking mechanism of a motorcycle with torque applying means to reduce the compression movement of the fork tube means relative to the slider means.

Another object of the present invention is the provision of a freely rotatable brake plate as part of a front wheel braking mechanism of a motorcycle which applies torquing action to control means connected between the brake plate and fork tube means for controlling the movement of the fork tube means relative to the slider means when braking action is applied to the front wheel braking mechanism.

A further object of the present invention is to provide torque applying means to a front wheel brake means of a motorcycle whereby the torque action of the torque applying means is translated into a semi-linear action thereby controlling the relative movement between the fork tube means and the slider means of the front fork assembly.

An additional object of the present invention is the provision of torque applying means as part of front braking means of a motorcycle which applies torquing action to linear applying means when front brake action is applied to the front braking means and the linear applying means applies linear action to the fork tube means thereby controlling the relative movement between the fork tube means and the slider means to prevent nosing down action of the front end of the motorcycle during application of the front brakes so that more effective control over the motorcycle is accomplished.

BRIEF DESCRIPTION OF THE DRAWING

The foregoing and other objects of the present invention will appear more fully from the following description and accompanying drawing illustrating a preferred embodiment of the invention. It is to be understood however that changes may be made from the exact details that have been shown and described without departing from the principles of the present invention.

FIG. 1 is a perspective view of the front section of a motorcycle showing the invention;

FIG. 2 is a part perspective view showing the torque arm connected to the brake plate; and FIG. 3 is a cross-sectional view showing the brake plate and torque arm connected thereto.

DETAILED DESCRIPTION OF THE INVENTION

Referring to the drawings, a front fork assembly 10 is pivotally connected to a motorcycle frame 12, and it includes a fork tube section 14 and a slider section 16. Fork tube section 14 is telescopically mounted within slider section 16 so that they move relative to each other and spring means are utilized to define shock absorbing means for the front wheel 18.

A front brake assembly 20 of conventional construction is mounted on the front wheel 18 and it includes a brake plate 22 that is rotatably mounted on axle 24 via bushing 26. The ends of axle 24 are disposed through openings in axle mounting projections 16a provided by slider sections 16 and they are secured in position by nuts 28. Brake plate 22 has brake shoes 30 movably mounted thereon which are operated by a lever 32 and a linkage 34 that has its ends connected to lever 32 and brake lever 36 that is pivotally mounted on the right handlebar adjacent the right handgrip 38. Brake shoes 30 are moved into engagement with brake drum 40 that is secured onto the wheel hub and rotatable therewith.

A torque arm 42 is secured onto brake plate 22 and is rotatable therewith. A rod member 44 has one end pivotally connected to torque arm 42 while its other end is pivotally connected to a clamp member 46 that is secured onto fork tube 14. Holes 48 are provided in torque arm 42 so that rod member 44 can be positioned at different locations therealong. If desired, brake plate 22 can be formed with an extension extending outwardly therefrom to form the torque arm instead of the torque arm being a separate member secured onto the brake plate.

The operation of the invention is according to the following:

When brake lever 36 is operated, braking action is translated to front brake assembly 20 via linkage 34 and lever 32 to move brake shoes 30 against brake drum 40 which causes braking of the front wheel. As a result of brake plate 22 being rotatably mounted relative to axle 24, a torquing action is applied to brake plate 22 when the front wheel braking takes place and this torquing action is also applied to torque arm 42 secured to brake plate 22. This torquing action is then applied to rod member 44 which is translated into a semi linear action that is applied to fork tube section 14 which then reduces the compression between fork tube section 14 and slider section 16.

In this way, the front end of the motorcycle does not nose down when braking action is applied to the front brake assembly and this results in more effective control over the motorcycle because weight distribution is maintained substantially uniform. During nighttime, the light from the headlight is directed down the roadway instead of right in front of the motorcycle. Thus, the present invention enables the motorcycle to be operated in a safer manner. Full suspension travel is maintained, even during braking, for road irregularities.

The shock absorber action of the fork assembly operates in accordance with normal operating procedure so that the present invention does not affect the normal operation thereof. The only time the present invention is operative is when the front brake assembly is actuated.

The linear action can be changed by connecting the end of the rod member 44 in other ones of holes 48 in torque arm 42. The closer rod member 44 is to axle 24, the greater the linear force that is applied to the fork tube section 14. The amount of the braking action will result in a resultant torquing action and linear action which will determine the amount of relative movement between the fork tube section and slider section.

While the present invention has been described in relation to expanding brake shoes against a brake drum, it is to be understood that the present invention can be used in conjunction with disc brake assemblies by using caliper torque and hydraulically-actuated braking means.

It can readily be discerned that control means in association with the front braking mechanism to control relative movement between the fork tube means and the slider means to provide more effective operational control of the motorcycle has been illustrated and described. Although the invention has been explained with reference to a particular embodiment, it is to be understood that various adaptations and modifications may be made without departing from the appended claims.

The invention is claimed in accordance with the following:

1. A braking mechanism for the front wheel of a motorcycle comprising:
    a front fork assembly pivotally mounted to a frame of said motorcycle and having handlebar means connected thereto, said front fork assembly including fork tube means and slider means, said fork tube means and said slider means being movable relative to each other and said slider means having the front wheel connected thereto by axle means;
    a braking assembly including brake plate means rotatably mounted on said axle means and having brake shoe means movably mounted thereon for engagement with brake drum means connected to the front wheel, and brake lever means connected to said brake shoe means to operate same;
    brake operating means provided on said handlebar means; linkage means extending between said brake operating means and said brake lever means; and
    control means which applies torquing and linear action to said fork tube means when said brake operating means through said linkage means operates said braking assembly thereby controlling relative movement between said fork tube means and said slider means, said control means comprising securing means connected to said fork tube means, a torque arm secured to said brake plate, and a freely movable connecting rod having one end thereof secured to said securing means and the other end thereof secured to said torque arm for enabling an upward force to be applied through said connecting rod.

2. A braking mechanism for the front wheel of a motorcycle comprising:
    a front fork assembly pivotally mounted to a frame of said motorcycle and having handlebar means connected thereto, said front fork assembly including fork tube means and slider means, said fork tube means and said slider means being movable relative to each other and said slider means having the front wheel connected thereto by axle means;
    a braking assembly including brake shoe means mounted on brake shoe mounting means, brake shoe engaging means connected to the front wheel, and brake operating means connected to said brake shoe means;
    lever means provided on said handlebar means; linkage means extending between said lever means and said brake operating means; and
    control means which applies torquing and linear action to said fork tube means when said lever means through said brake operating means operates said braking assembly thereby controlling relative movement between said fork tube means and said slider means, said control means comprising securing means connected to said fork tube means, a torque plate connected to said braking assembly and having a portion extending therefrom, and a freely movable connecting rod interconnecting the extending portion of said torque plate and said securing means for enabling an upward force to be applied through said connecting rod.

* * * * *